United States Patent
Flosbach et al.

(10) Patent No.: US 7,273,530 B2
(45) Date of Patent: Sep. 25, 2007

(54) PROCESS FOR THE PRODUCTION OF DECORATIVE COATINGS ON SUBSTRATES

(75) Inventors: Carmen Flosbach, Wuppertal (DE); Peter Frese, Landshut (DE); Phu Qui Nguyen, Moenchengladbach (DE); Martin Wulf, Duesseldorf (DE)

(73) Assignee: E.I. du Pont de Nemours & Company, Wilmington, DE (US)

( * ) Notice: Subject to any disclaimer, the term of this patent is extended or adjusted under 35 U.S.C. 154(b) by 487 days.

(21) Appl. No.: 10/818,278

(22) Filed: Apr. 5, 2004

(65) Prior Publication Data

US 2005/0224169 A1 Oct. 13, 2005

(51) Int. Cl.
*B29C 65/04* (2006.01)
*B32B 37/00* (2006.01)

(52) U.S. Cl. .................... 156/230; 156/275.5
(58) Field of Classification Search ............ 428/40.8, 428/408; 159/46; 430/253, 396; 427/140; 174/50.5; 438/445; 156/272.2, 230, 275.5
See application file for complete search history.

(56) References Cited

U.S. PATENT DOCUMENTS

| 196,595 | A | * | 10/1877 | Morris ..................... 159/46 |
| 4,454,179 | A | * | 6/1984 | Bennett et al. ............. 428/40.8 |
| 5,250,387 | A | * | 10/1993 | Held et al. ................. 430/253 |
| 5,258,576 | A | * | 11/1993 | Neumann et al. .......... 174/50.5 |
| 6,958,171 | B2 | * | 10/2005 | Flosbach et al. ............ 427/140 |

FOREIGN PATENT DOCUMENTS

| EP | 0 251 546 A2 | 7/1988 |
| EP | 0 361 351 A2 | 4/1990 |
| WO | WO 00/08094 A1 | 2/2000 |
| WO | WO 00/63015 A1 | 10/2000 |
| WO | WO 03/013739 A2 | 2/2003 |
| WO | WO 03/092912 A1 | 11/2003 |

\* cited by examiner

*Primary Examiner*—Richard Crispino
*Assistant Examiner*—Pedram Parvini
(74) *Attorney, Agent, or Firm*—Sudhir G. Deshmukh

(57) ABSTRACT

The invention relates to a process for the production of decorative coatings, comprising the following steps:
 A) providing a substrate to be coated and a backing film coated on one side with an uncured or only partially cured coating of a coating composition curable by means of high-energy radiation,
 B) forming zones on the backing film which are opaque to high-energy radiation and correspond to the negative image of a desired pattern or decoration,
 C) applying the coated side of the backing film having the uncured or only partially cured coating of a coating composition curable by means of high-energy radiation with the coated side thereof onto a substrate surface,
 D) curing the coating applied by the backing film by irradiation with high-energy radiation through the backing film,
 E) removing the backing film from the coating which remains on the substrate, and
 F) removing the un-irradiated and thus uncured parts of the coating remaining on the substrate to obtain the desired pattern or decoration.

14 Claims, No Drawings

PROCESS FOR THE PRODUCTION OF DECORATIVE COATINGS ON SUBSTRATES

BACKGROUND OF THE INVENTION

1. Field of the Invention

The invention relates to a process for the production of decorative coatings on substrates using backing films provided with an uncured or only partially cured coating.

2. Description of Related Art

Backing films coated on one side with an uncured or only partially cured coating composition are known from WO 03/013739 and WO 03/092912. These coated backing films are used for the repair of damaged coatings on substrate surfaces, wherein the coating layer is transferred onto the substrate and cured. As a result, only the cured coating layer remains on the substrate, but not the backing film, which is removed before or after completion of curing. However, the prior art does not teach the application of special decorative patterns on substrates.

Processes are also known in which coated films are applied for decorative purposes onto substrates, for example, vehicle bodies. Such processes are described, for example, in WO 00/08094, WO 00/63015, EP 251546 and EP 361351. In general, the film is laminated onto the substrate, where it remains.

There is accordingly a requirement for coating processes for the decorative coating of substrates using coated backing films, with which even complicated decorative patterns may be produced on the substrate surfaces concerned.

SUMMARY OF THE INVENTION

The invention relates to a process for the production of decorative coatings, comprising the following steps:

A) providing a substrate to be coated and a backing film coated on one side with an uncured or only partially cured coating of a coating composition curable by means of high-energy radiation, B) forming zones on the backing film which are opaque to high-energy radiation and correspond to the negative image of a desired pattern or decoration, C) applying the coated side of the backing film having the uncured or only partially cured coating of a coating composition curable by means of high-energy radiation onto a substrate surface, D) curing the coating applied by the backing film by irradiation with high-energy radiation through the backing film, E) removing the backing film from the coating which remains on the substrate and F) removing any un-irradiated and thus uncured parts of the coating remaining on the substrate to obtain the desired pattern or decoration, wherein the zones on the backing film which are opaque to high-energy radiation and correspond to the negative image of a desired pattern or decoration are produced before or after application of the coated backing film onto the substrate surface.

DETAILED DESCRIPTION OF THE EMBODIMENTS

If the zones which are opaque to high-energy radiation are produced before application of the coated backing film onto the substrate surface, this may in turn proceed before or after the backing film is coated with the coating composition curable by means of high-energy radiation. In other words, steps A), B) and C) need not necessarily be performed in succession; depending on how the process is performed, a modified sequence is also possible.

The high-energy radiation used in particular comprises ultraviolet (UV) or electron beam radiation. However, for simplicity's sake, only UV radiation will be mentioned below.

The substrates provided in step A) of the process according to the invention may comprise substrates made from any desired coatable materials, for example, metal, plastics, wood or glass. The substrates may be uncoated or have a single layer or multi-layer prior coating, for example, a paint finish. The substrates to be coated may, for example, comprise automotive bodies, body parts or body fittings, furniture, machinery or other industrial goods.

The individual steps of the method according to the invention are explained in greater detail below.

Step A) of the process according to the invention comprises providing a backing film coated on one side with an uncured or only partially cured coating layer of a coating composition curable by means of high energy radiation. The backing film comprises coloured or colourless, in particular transparent, films made from any desired, in particular thermoplastic plastics which must meet certain requirements with regard to UV transmittance and heat resistance. The films must transmit UV radiation and be resistant to the temperatures which occur with UV radiation. The films must also be resistant to the temperatures, optionally, required for softening the applied coating layer. Suitable film materials are, for example, polyolefins, such as polyethylene, polypropylene, polyurethane, polyamide and polyesters, such as polyethylene terephthalate and polybutylene terephthalate. Films may also consist of polymer blends and may also, optionally, be surface-treated.

The thickness of the films may, for example, be between 10 and 1000 µm, preferably, between 10 and 500 µm, particularly preferably between 20 and 250 µm and is determined by practical considerations of processability. The films selected should preferably be those which are resilient and extensible and cling effectively to the substrate by electrostatic forces.

The backing films are coated on one side with coating compositions curable by means of UV radiation which assume liquid, paste or melt form. The coating compositions may be aqueous, diluted with solvents or contain neither solvents nor water. The coating compositions curable by irradiation with UV radiation are cationically and/or free-radically curable coating compositions known to the person skilled in the art. Free-radically curable coating compositions are preferred.

Cationically curable coating compositions to be applied onto the backing film in the process according to the invention contain one or more cationically polymerisable binders. These may comprise the conventional binders known to the person skilled in the art, such as, for example, polyfunctional epoxy oligomers containing more than two epoxy groups per molecule. These comprise, for example, polyalkylene glycol diglycidyl ethers, hydrogenated bisphenol A glycidyl ethers, epoxyurethane resins, glycerol triglycidyl ether, diglycidyl hexahydrophthalate, diglycidyl esters of dimer acids, epoxidised derivatives of (methyl) cyclohexene, such as, for example, 3,4-epoxycyclohexylmethyl (3,4-epoxycyclohexane)carboxylate or epoxidised polybutadiene. The number average molar mass of the polyepoxy compounds is preferably below 10,000 g/mol.

Reactive diluents, such as, for example, cyclohexene oxide, butene oxide, butanediol diglycidyl ether or hexanediol diglycidyl ether, may also be used.

The cationically curable coating compositions may contain one or more photoinitiators. Photoinitiators which may be used are onium salts, such as, for example, diazonium salts and sulfonium salts.

Free-radically curable coating compositions which are preferably to be applied onto the backing film in the process according to the invention contain one or more binders with free-radically polymerisable olefinic double bonds. Suitable binders with free-radically polymerisable olefinic double bonds which may be considered are, for example, any binders known to the person skilled in the art which can be crosslinked by free-radical polymerisation. These binders are prepolymers, such as polymers and oligomers containing, per molecule, one or more, preferably, on average 2 to 20, particularly preferably, 3-10 free-radically polymerisable olefinic double bonds. The polymerisable double bonds may, for example, be present in the form of (meth)acryloyl, vinyl, allyl, maleinate and/or fumarate groups. The free-radically polymerisable double bonds are particularly preferably present in the form of (meth)acryloyl groups.

Both here and below, (meth)acryloyl or (meth)acrylic are intended to mean acryloyl and/or methacryloyl or acrylic and/or methacrylic.

Examples of prepolymers or oligomers include (meth)acryloyl-functional poly(meth)acrylates, polyurethane (meth)acrylates, polyester (meth)acrylates, unsaturated polyesters, polyether (meth)acrylates, silicone (meth)acrylates, epoxy (meth)acrylates, amino (meth)acrylates and melamine (meth)acrylates. The number average molar mass Mn of these compounds may, for example, be from 500 to 10,000 g/mol, preferably from 500 to 5000 g/mol. The binders may be used individually or as a mixture. (Meth)acryloyl-functional poly(meth)acrylates and/or polyurethane (meth)acrylates are preferably used.

The prepolymers may be used in combination with reactive diluents, i.e., free-radically polymerisable low molecular weight compounds with a molar mass of below 500 g/mol. The reactive diluents may be mono-, di- or polyunsaturated. Examples of monounsaturated reactive diluents are (meth)acrylic acid and the esters thereof, maleic acid and the semi-esters thereof, vinyl acetate, vinyl ether, substituted vinyl ureas, styrene, vinyltoluene. Examples of diunsaturated reactive diluents are di(meth)acrylates such as alkylene glycol di(meth)acrylate, polyethylene glycol di(meth)acrylate, 1,3-butanediol di(meth)acrylate, vinyl (meth)acrylate, allyl (meth)acrylate, divinylbenzene, dipropylene glycol di(meth)acrylate, hexanediol di(meth)acrylate. Examples of polyunsaturated reactive diluents are glycerol tri(meth)acrylate, trimethylolpropane tri(meth)acrylate, pentaerythritol tri(meth)acrylate, pentaerythritol tetra(meth)acrylate. The reactive diluents may be used alone or in mixture.

Preferred free-radically curable coating compositions may contain one or more photoinitiators, for example, in quantities of 0.1 to 5 wt. %, preferably of 0.5 to 3 wt. %, relative to the sum of free-radically polymerisable prepolymers, reactive diluents and photoinitiators. Examples of photoinitiators are benzoin and derivatives thereof, acetophenone and derivatives thereof, for example 2,2-diacetoxyacetophenone, benzophenone and derivatives thereof, thioxanthone and derivatives thereof, anthraquinone, 1-benzoylcyclohexanol, organophosphorus compounds, such as for example acyl phosphine oxides. The photoinitiators may be used individually or in combination.

The coating compositions, which may be used in the process according to the invention for coating the backing film, preferably comprise coloured coating compositions. The coating compositions may be pigmented with colour-imparting and/or special effect-imparting pigments. They may, however, optionally contain transparent pigments and/or soluble dyes in addition to the colour-imparting and/or special effect-imparting pigments. Suitable colour-imparting pigments are any conventional coating pigments of an organic or inorganic nature. Examples of inorganic or organic colour-imparting pigments are titanium dioxide, micronised titanium dioxide, iron oxide pigments, carbon black, azo pigments, phthalocyanine pigments, quinacridone or pyrrolopyrrole pigments. Examples of special effect-imparting pigments are metal pigments, for example made from aluminum or copper; interference pigments, such as, for example, metal oxide coated metal pigments, titanium dioxide coated mica. The coating compositions may also contain fillers. Examples of usable fillers are silica, aluminium silicate, barium sulfate, calcium carbonate and talcum.

The coating compositions may also contain conventional coating additives. Examples of conventional coating additives include levelling agents, rheological agents, such as highly dispersed silica or polymeric urea compounds, thickeners, for example, based on partially crosslinked, carboxyfunctional polymers or on polyurethanes, defoamers, wetting agents, anticratering agents, catalysts, antioxidants and light stabilisers based on HALS (hindered amine light stabilizer) products and/or UV absorbers. The additives are used in conventional amounts known to the person skilled in the art.

The coating compositions may contain water and/or organic solvents. The latter comprise conventional organic coating solvents known to the person skilled in the art.

The coating compositions curable by means of UV radiation may be applied onto the backing film by conventional methods, for example by brushing, roller coating, casting, knife coating, spraying or electrostatic spraying or by screen printing. The coating composition may be applied as a melt or in the liquid phase, for example as a solution. The coating compositions may, for example, be knife coated as a solution. In the subsequent drying process, the solvent is allowed to evaporate, optionally with gentle heating. The dried, uncrosslinked coating should advantageously be slightly tacky at room temperature in order to ensure good adhesion onto the substrate to be decorated. The coating may either be intrinsically tacky due to specially formulated binders or tackiness may be achieved by slight partial crosslinking/gelling of the dried coating, for example, by heating and/or by UV irradiation. However, the coating must not in any event cure completely at this stage. The coating compositions curable by means of UV radiation are generally applied in dry film thicknesses of 1 to 100 μm, preferably of 5 to 60 μm.

In order to facilitate subsequent removal of the backing film from the substrate to be decorated, it may be advantageous to leave at least one edge zone of the backing film uncoated. It may also be advantageous to provide a special finish on the side of the backing film which is to be coated, for example, a release coating, or to use special surface-treated films, for example, films surface-modified with silicate layers, in order, on removal of the backing film, to facilitate detachment from the coating which is fixed to the substrate to be decorated.

It may also be advantageous to provide the coated backing film with a temporary protective film to provide protection.

The protective film may here be present only on the coated side of the backing film, but it may also be applied onto both sides and completely enclose the entire coated backing film. In order to protect the coating on the backing film from premature polymerisation brought about by UV radiation, a transparent or coloured, for example, black, UV-opaque material may advantageously be used for the protective film. A black polyethylene protective film may, for example, be used. In order to facilitate detachment of the protective film, it too may also, as described above, be provided with non-stick properties. The coating may be protected by using a release paper instead of a protective film.

The backing films coated on one side and optionally, provided with a protective film, protective wrapping or release paper, may be prefabricated and stored in the most varied shapes and sizes, for example in sizes of 5 cm$^2$ to 1 m$^2$. Depending on the object to be decorated, larger films are, of course, also possible. The films may also be stored as a reel of continuous film.

In step B) of the process according to the invention, zones opaque to UV radiation are produced on the UV-transmitting backing film in order to avoid curing at these points on subsequent irradiation. The zones opaque to UV radiation here correspond to the negative image of a desired pattern or decoration or the UV radiation transmitting zones correspond to the desired pattern or decoration which is ultimately to be produced on the substrate surface to be decorated.

There are various possible ways of producing zones opaque to UV radiation on the backing film. In principle, the zones opaque to UV radiation may be produced before or after application of the backing film onto the substrate surface. Preferably, a coating opaque to UV radiation corresponding to the negative image of a desired pattern or decoration is applied onto an uncoated side of the backing film before the backing film is applied onto the substrate surface. This may in turn proceed before the backing film is coated with the UV-curable coating composition or thereafter. Coating to produce the zones opaque to UV radiation may, for example, proceed by printing, for example by means of screen printing, inkjet printing or laser printing. The layer applied, for example, printed, in order to produce zones opaque to UV radiation is completely dried or cured after application. Selection of corresponding coating compositions is not subject to any particular restrictions with regard to the binders and the further components. All that must be ensured is that the coating obtained in this manner does not transmit UV radiation. This may be achieved, for example, by appropriate pigmenting. If the zones opaque to UV radiation are produced before the backing film is coated with the UV curable coating composition, the UV curable coating composition may be applied onto the side of the film which comprises zones opaque to UV radiation or onto the side of the film which does not comprise zones opaque to UV radiation. In the former case, the image which is to be printed, for example, must be applied onto the film not only as a negative image but also as a mirror-reversed image of the desired pattern or decoration.

It is furthermore also possible to produce the zones opaque to UV radiation on the uncoated side of the backing film after the backing film has been applied with its coated side onto the substrate surface. The already applied coated backing film may here be masked off with a UV-opaque mask or stencil in the form of the negative image of a desired pattern or decoration. The entire mask may be UV-opaque and correspond in its overall shape to the negative image of a desired pattern or decoration or the mask may contain only specific UV-opaque zones in the form of the negative image of a desired pattern or decoration.

Obviously, the size of the mask must correlate with the size of the backing film used.

A suitable selection of correspondingly coated and printed films may, in principle, be prefabricated and held in stock and so be quickly available for use. Alternatively, a suitable selection of films coated on only one side and corresponding masks may be prefabricated and held in stock.

After provision of a backing film coated on one side with a UV curable coating composition and removal of an optionally present protective film, protective envelope or release paper, the backing film is applied with its coated side onto the substrate surface to be decorated in accordance with step C) of the process according to the invention. The substrate surface to be decorated may be lightly keyed or roughened before application of the coated backing film in order to ensure good adhesion. The film is then laminated onto the substrate, preferably with exposure to pressure and, optionally, heat, so fixing the coating onto the substrate to be decorated. This may, for example, be carried out with a heatable roller, for example, a rubber roller. The coated backing film may here be applied onto any uncoated or already coated substrate surfaces.

After application of the coated side of the coated backing film onto the substrate surface to be decorated and the prior or subsequent production of UV-opaque zones on one side of the backing film, the coating applied in this manner is irradiated with UV radiation through the backing film.

The preferred source of radiation comprises UV radiation sources emitting in the wave length range from 180 to 420 nm, in particular from 200 to 400 nm. Examples of such UV radiation sources are optionally doped high, medium and low pressure mercury vapour emitters, gas discharge tubes, such as, for example, low pressure xenon lamps and UV lasers.

Apart from these continuously operating UV radiation sources, however, it is also possible to use discontinuous UV radiation sources. These are preferably so-called high-energy flash devices (UV flash lamps). The UV flash lamps may contain a plurality of flash tubes, for example, quartz tubes filled with inert gas, such as xenon. The UV flash lamps have an illuminance of, for example, at least 10 megalux, preferably, from 10 to 80 megalux per flash discharge. The energy per flash discharge may be, for example, 1 to 10 kjoule.

The irradiation time with UV radiation when UV flash lamps are used as the UV radiation source may be, for example, in the range from 1 millisecond to 400 seconds, preferably, from 4 to 160 seconds, depending on the number of flash discharges selected. The flashes may be triggered, for example, about every 4 seconds. Curing may take place, for example, by means of 1 to 40 successive flash discharges.

If continuous UV radiation sources are used, the irradiation time may be, for example, in the range from a few seconds to about 5 minutes, preferably less than 5 minutes. The distance between the UV radiation sources and the surface to be irradiated may be, for example, 5 to 60 cm.

It may be advantageous to assist the UV radiation curing by the supply of thermal energy.

For completeness' sake, it should be mentioned that when electron beam radiation is used as the high-energy radiation, it is, of course, necessary to use electron beam transmitting film materials and correspondingly, to produce electron beam-opaque zones on the film.

After irradiation with UV radiation through the backing film, the backing film, optionally together with the mask, is removed after the irradiation. If thermal energy was additionally supplied, the coating is first allowed to cool before the backing film is removed.

After removal of the backing film, optionally together with the mask, a coating remains on the substrate surface, which comprises fully cured and uncured zones. The un-irradiated and thus uncured zones of the coating are removed. This may, for example, proceed by rinsing with organic solvents, such as ketones, for example, acetone, alcohols, for example, isopropanol or esters, for example butyl acetate or ethyl acetate. If water-soluble binders have been used, rinsing may also be performed using water or mixtures of water and water-miscible organic solvents. If necessary, surfactants may also be added to the solvents or mixtures used for rinsing. Once the uncured zones of the coating have been rinsed away, the desired pattern/decoration is obtained on the substrate surface, said pattern/decoration generally contrasting with the background with regard to colour or special effect. If desired, the surface decorated in this manner, in particular, the pattern or decoration produced, may be overcoated with a final transparent coating layer to provide protection. Finally, the correspondingly decorated substrate surface may optionally also be polished.

The process according to the invention may be used to provide decorative coating on any desired coated or uncoated substrates, for example, in industrial and vehicle coating and in general in any application in which substrate surfaces are to be provided with patterns or decoration, including pictures, logos, graphics or words. In addition to coating for purely decorative purposes, the applied pictures, logos, words etc. may also serve to provide information and marking. Use in workshops, such as, for example, automotive repair shops or body shops, or in do-it-yourself applications is also possible. The particular advantage of the process according to the invention is that it is relatively straightforwardly possible to produce exactly reproducible patterns, pictures or logos on substrate surfaces by means of prefabricated, coated backing films, without involving costly spray application.

The following Examples are intended to illustrate the invention in greater detail.

EXAMPLE

Production of a Coated Backing Film

A polyurethane resin curable by means of UV radiation was first produced as follows:

369.4 parts by weight (pbw) of isophorone diisocyanate were combined with 0.6 pbw of methylhydroquinone and 80 pbw of butyl acetate in a 2 L four-necked flask with a stirrer, thermometer, dropping funnel and reflux condenser and heated to 80° C. A mixture of 193 pbw of hydroxyethyl acrylate and 0.5 pbw of dibutyltin dilaurate was added dropwise in such a manner that the reaction temperature did not rise above 100° C. 50 pbw of butyl acetate were used to rinse out the dropping funnel. The temperature was maintained at a maximum of 100° C. until an NCO-value of 10.1 was obtained. 300 pbw of a polycaprolactone triol (Capa 305 from Interox Chemicals) and 50 pbw of butyl acetate were then added. The reaction mixture was maintained at a maximum of 100° C. until an NCO-value of <0.5 was obtained. The mixture was then diluted with 69.6 pbw of butyl acetate. A colourless, highly viscous resin with a solids content of 75 wt. % (1 h/150° C.) and a viscosity of 10,000 mPas was obtained.

A UV curable pigmented coat was then produced from the following constituents:

80.8 wt. % of the acryloyl-functional polyurethane resin produced above
1.3 wt. % of a conventional commercial photoinitiator (Irgacure® 184, CIBA)
0.1 wt. % of a conventional commercial levelling agent (Ebecryl® 350, UCB)
0.8 wt. % of a conventional commercial UV absorbent (Tinuvin® 384, CIBA)
0.8 wt. % of a conventional commercial light stabiliser (HALS based) (Tinuvin® 292, CIBA)
1.1. wt. % of a red pigment Paliogenmaron L 3920 BASF)
15.1 wt. % of butyl acetate.

The backing film prepared was a 20 µm thick polyester film (20 cm by 15 cm) printed with the negative image of a logo with a carbon black containing ink, the printed areas of the polyester film being opaque to UV radiation. The red pigmented coating produced above was then applied onto the unprinted side of the polyester film. To this end, the coating was applied by knife coating to a dry film thickness of approximately 40 µm. The applied coating layer was dried for 10 minutes at 60° C. to evaporate the solvent. A slightly tacky, no longer flowable surface was obtained.

Application of the Coated Backing Film

The coated film prepared above was laid with its coated side onto a motor vehicle bonnet (hood) which was to be decorated. The bonnet had a typical automotive multi-layer coating comprising electrodeposited primer, filler coat, base coat and clear coat. The coating film was then heated through the film with an IR radiation emitter to approximately 80° C. and laminated without bubbles onto the blemished area under gentle pressure. The still warm and liquid coating material was then irradiated through the film by means of 15 flashes from a UV flash lamp (3000 Ws) at a distance of 20 cm. The flashes were triggered every 4 seconds. After irradiation, the film was peeled off. The uncured zones of the coating remaining on the substrate were then rinsed away with isopropanol. A perfectly formed red logo of the desired kind was left behind on the surface.

What we claim is:

1. A process for the production of decorative coatings on substrate surfaces comprising the following steps:
   A) providing a substrate to be coated and a backing film coated on one side with an uncured or only partially cured coating of a coating composition curable by means of high-energy radiation,
   B) forming zones on the backing film which are opaque to high-energy radiation and correspond to the negative image of a desired pattern or decoration,
   C) applying the coated side of the backing film having the uncured or only partially cured coating of a coating composition curable by means of high-energy radiation with the coated side thereof onto a substrate surface,
   D) curing the coating applied by the backing film by irradiation with high-energy radiation through the backing film,
   E) removing the backing film from the coating which remains on the substrate, and
   F) removing any un-irradiated and uncured parts of the coatIng remaining on the substrate to obtain a desired pattern or decoration, wherein the zones on the backing film which are opaque to high-energy radiation and correspond to the negative image of a desired pattern or decoration are produced before or after application of the coated backing film onto the substrate surface.

2. A process according to claim 1, wherein the zones opaque to high-energy radiation are produced before application of the coated backing film onto the substrate surface.

3. A process according to claim 1, wherein the zones opaque to high-energy radiation are produced before the backing film is coated with the coating composition curable by means of high-energy radiation.

4. A process according to claim 3, wherein the coating composition curable by means of high-energy radiation is applied onto the side of the backing film which does not comprise the zones opaque to high-energy radiation.

5. A process according to claim 1, wherein the zones opaque to high-energy radiation are produced after application of the backing film onto the substrate surface by masking off the backing film with an at least partially UV-opaque mask or stencil.

6. A process according to claim 1, wherein the zones opaque to high-energy radiation are produced by printing UV-opaque coatings onto one side of the backing film.

7. A process according to claim 1, wherein the uncured or only partially cured coating layer applied onto the backing film comprises a coating layer with a tacky surface.

8. A process according to claim 1, wherein the coating composition curable by means of high energy radiation comprises a coating composition with free-radically polymerisable binders, cationically polymerizable binders or mixtures thereof.

9. A process according to claim 1, wherein irradiation proceeds with UV radiation of the wavelength range of 180-400 nm.

10. A process according to claim 1, wherein removal of the un-irradiated and uncured portions of the coating remaining on the substrate proceeds by rinsing with organic solvents, water or mixtures of organic solvents and water.

11. A process according to claim 1 for providing a decorative coating on coated or uncoated substrate surfaces.

12. A process according to claim 1, wherein the substrate surfaces to be decorated comprise vehicle coating or industrial coatings.

13. A process according to claim 1, wherein the substrate is automotive body, body part, body fining, furniture, machinery, or an industrial goods.

14. A process for producing a desired pattern or decoration on surface of a substrate comprising:
  A) providing one side of a backing film with an uncured or only partially cured coating of a coating composition curable by means of high-energy radiation,
  B) forming zones on the other side of the backing film that are opaque to high-energy radiation and which correspond to the negative image of said desired pattern or decoration,
  C) applying the coated side of the backing film having the uncured or only partially cured coating of said coating composition onto said surface of said substrate,
  D) curing the uncured or only partially cured coating by irradiation with high-energy radiation passed Through the backing film,
  E) removing the backing film from the cured coating which remains on the surface of said substrate, and
  F) removing any un-irradiated and uncured parts of the coating remaining on the surface of said substrate to obtain said desired pattern or decoration thereon, wherein said zones on the backing film are produced before or after application of the coated backing film onto the substrate surface.

* * * * *